United States Patent
Chung et al.

(10) Patent No.: US 9,819,045 B2
(45) Date of Patent: *Nov. 14, 2017

(54) METHOD OF MANUFACTURING SECONDARY BATTERY

(71) Applicant: LG Chem, Ltd., Seoul (KR)

(72) Inventors: Mikyung Chung, Daejeon (KR); Sung-Kyun Chang, Daejeon (KR); Soojin Kim, Daejeon (KR); In Sung Uhm, Daejeon (KR); Won Seok Chang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/422,905

(22) PCT Filed: Nov. 8, 2013

(86) PCT No.: PCT/KR2013/010105
§ 371 (c)(1),
(2) Date: Feb. 20, 2015

(87) PCT Pub. No.: WO2014/073898
PCT Pub. Date: May 15, 2014

(65) Prior Publication Data
US 2015/0280272 A1 Oct. 1, 2015

(30) Foreign Application Priority Data
Nov. 8, 2012 (KR) .......................... 10-2012-0125809

(51) Int. Cl.
*H01M 10/052* (2010.01)
*H01M 10/04* (2006.01)
(Continued)

(52) U.S. Cl.
CPC ..... *H01M 10/0413* (2013.01); *H01M 2/0237* (2013.01); *H01M 2/36* (2013.01);
(Continued)

(58) Field of Classification Search
CPC ..................... H01M 10/052; H01M 10/0525
See application file for complete search history.

(56) References Cited

U.S. PATENT DOCUMENTS 2,996,038 A    8/1961   Hunicke
6,589,694 B1   7/2003   Gosho et al.
(Continued)

FOREIGN PATENT DOCUMENTS

CN     102612767 A    7/2012
JP      H03-53448 A    3/1991
(Continued)

OTHER PUBLICATIONS

International Search Report for Application No. PCT/KR2013/010106 dated Jan. 22, 2014.
(Continued)

*Primary Examiner* — Olatunji Godo
(74) *Attorney, Agent, or Firm* — Lerner, David, Littenberg, Krumholz & Mentlik, LLP

(57) ABSTRACT

Disclosed is a method of manufacturing a secondary battery, built in a battery case, having an electrode assembly impregnated with an electrolyte solution, the method including:
(a) injecting an electrolyte solution as a target into a chamber equipped with a vibrating probe;
(b) impregnating by soaking an electrode assembly, which has a separator interposed between a cathode and an anode, in an electrolyte solution contained in the chamber;
(c) applying vibration at a frequency of 20 to 100 kHz of to the electrolyte solution with the vibrating probe; and
(Continued)

(d) moving the electrode assembly with the electrolyte solution into a battery case, whereby interfacial wetting of the electrode assembly and the electrolyte solution is improved.

A secondary battery manufactured according to the method may have improved electrolyte solution impregnation properties, ionic conductivity, electronic conductivity and the like and, as such, may have improved electrochemical performance.

18 Claims, 1 Drawing Sheet

(51) Int. Cl.
    *H01M 2/36*     (2006.01)
    *H01M 10/058*     (2010.01)
    *H01M 2/02*     (2006.01)

(52) U.S. Cl.
    CPC ......... *H01M 10/04* (2013.01); *H01M 10/052* (2013.01); *H01M 10/058* (2013.01); *H01M 2220/20* (2013.01); *Y02E 60/122* (2013.01); *Y02P 70/54* (2015.11); *Y02T 10/7011* (2013.01); *Y10T 29/49115* (2015.01)

(56) References Cited

U.S. PATENT DOCUMENTS

| | | | |
|---|---|---|---|
| 2004/0068863 A1* | 4/2004 | Cintra | H01M 2/361 29/623.1 |
| 2011/0097630 A1 | 4/2011 | Choi et al. | |
| 2012/0034531 A1 | 2/2012 | Senda et al. | |
| 2013/0065111 A1 | 3/2013 | Kim et al. | |

FOREIGN PATENT DOCUMENTS

| | | |
|---|---|---|
| JP | 10050296 A | 2/1998 |
| JP | 2006-294282 A | 10/2006 |
| JP | 2007096048 A | 4/2007 |
| KR | 20000061587 A | 10/2000 |
| KR | 10-0528900 B1 | 11/2005 |
| KR | 20070082927 A | 8/2007 |
| KR | 20110101331 A | 9/2011 |
| KR | 101134122 B1 | 4/2012 |
| KR | 20120033647 A | 4/2012 |

OTHER PUBLICATIONS

International Search Report for Application No. PCT/KR2013/010103 dated Jan. 22, 2014.

International Search Report for Application No. PCT/KR2013/010105 dated Jan. 22, 2014.

* cited by examiner

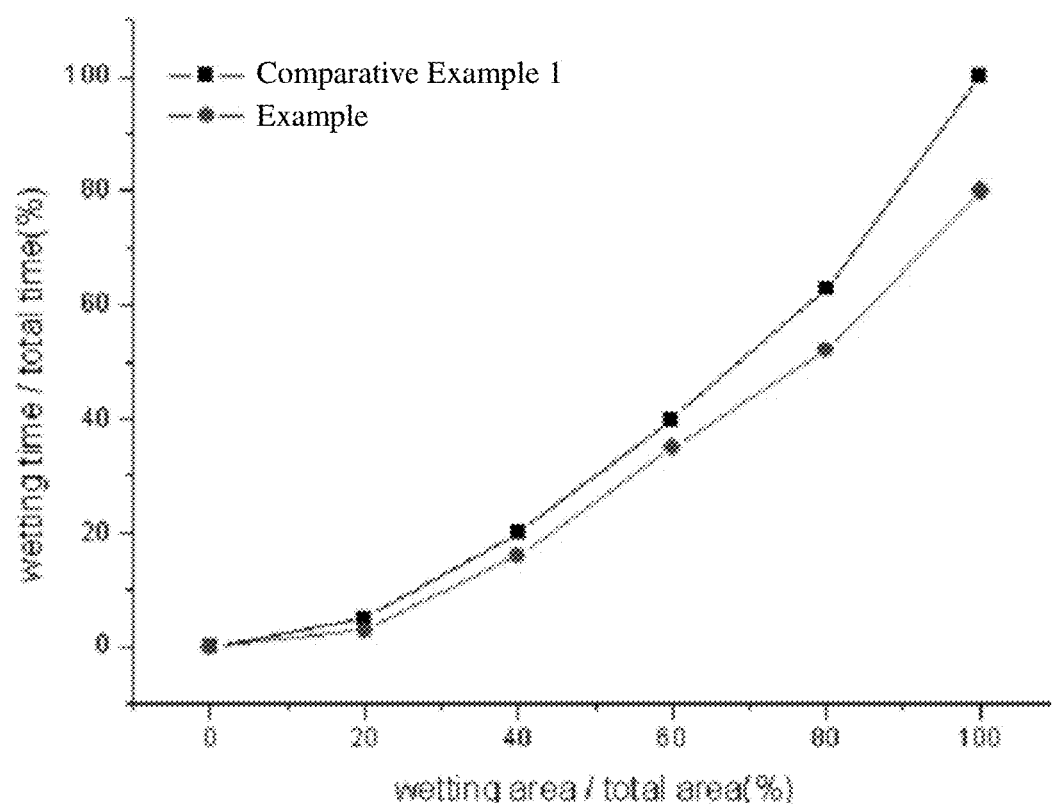

METHOD OF MANUFACTURING SECONDARY BATTERY

CROSS REFERENCE TO RELATED APPLICATIONS

The present application is a national phase entry under 35 U.S.C. §371 of International Application No. PCT/KR2013/010105, filed Nov. 8, 2013, which claims priority to Korean Patent Application No. 10-2012-0125809, filed Nov. 8, 2012, all of which are hereby incorporated herein by reference.

TECHNICAL FIELD

The present invention relates to a method of manufacturing a secondary battery, built in a battery case, having an electrode assembly impregnated with an electrolyte solution, the method including:

(a) injecting an electrolyte solution as a target into a chamber equipped with a vibrating probe;

(b) impregnating by soaking an electrode assembly, which has a separator interposed between a cathode and an anode, in an electrolyte solution contained in the chamber;

(c) applying vibration at a frequency of 20 to 100 kHz to the electrolyte solution with the vibrating probe; and (d) moving into the electrode assembly with the electrolyte solution into a battery case, whereby interfacial wetting of the electrode assembly and the electrolyte solution is improved.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A lithium secondary battery has a structure in which an electrode assembly, in which a porous separator is interposed between a cathode and an anode, each of which includes an active material coated on an electrode current collector, is impregnated with a lithium salt-containing non-aqueous electrolyte solution.

A general lithium secondary battery assembly process is performed by finally injecting an electrolyte solution into a battery case after alternately stacking a cathode, an anode and a separator and then inserting the cathode, the anode and the separator into the battery case made of a can or a pouch having a certain size and shape. Here, the finally injected electrolyte solution infiltrates a cathode, an anode and a separator by capillary force. However, due to material characteristics such as a cathode, an anode and a separator which are hydrophobic, and an electrolyte solution which is hydrophilic, substantial time and a difficult process are required until an electrode and a separator are wetted with an electrolyte solution.

In addition, devices or equipment are being enlarged and thereby volume, into which an electrolyte solution is infiltrated, is reduced and area, into which an electrolyte solution infiltrates, increases, and, accordingly, there is a high possibility that an electrolyte solution does not enter into a battery and locally exists outside. The amount of an electrolyte solution in a battery manufactured according to such a process battery is partially insufficient, and thereby battery capacity and performance are dramatically reduced.

To improve electrode wetting properties, methods such as injecting an electrolyte solution at high temperature, injecting an electrolyte solution at added or reduced pressure, or the like are used. However, when the methods are used, an electrode assembly and an electrolyte solution may be transformed and thereby problems such as internal short circuit and the like may occur.

Therefore, there is an urgent need for a method of manufacturing a secondary battery having stability at high temperature and improved wetting properties.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a secondary battery is manufactured including a step applying predetermined vibration to an electrolyte solution with a vibrating probe by injecting an electrolyte solution into a chamber equipped with the vibrating probe, desired effects may be obtained, thus completing the present invention.

Technical Solution

In accordance with one aspect of the present invention, provided is a method of manufacturing a secondary battery, built in a battery case, having an electrode assembly impregnated with an electrolyte solution, the method including:

(a) injecting an electrolyte solution as a target into a chamber equipped with a vibrating probe;

(b) impregnating by soaking an electrode assembly, which has a separator interposed between a cathode and an anode, in an electrolyte solution contained the chamber;

(c) applying vibration at a frequency of 20 to 100 kHz to the electrolyte solution with the vibrating probe; and (d) moving the electrode assembly with the electrolyte solution into a battery case, whereby interfacial wetting of the electrode assembly and the electrolyte solution is improved.

That is, the method of manufacturing the secondary battery according to the present invention includes applying predetermined vibration to the electrolyte solution, in which the electrode assembly is soaked, using the chamber equipped with the vibrating probe. Accordingly, mobility of electrolytic materials may be increased and thereby interfacial contact properties, namely, wetting properties, of the electrode assembly and the electrolyte solution may be improved.

Furthermore, since the electrode assembly is previously impregnated in the chamber containing the electrolyte solution and then moved into the battery case, an impregnation rate of the electrode assembly is improved and thereby the electrolyte solution exhibits superior impregnation properties, and, at the same time, a plurality of electrode assemblies may be impregnated at once and thereby a process of manufacturing a battery may be improved.

The term "target" according to the present invention means an electrolyte solution as a subject to which vibration is applied with a vibrating probe.

The vibration of step (b) may be performed by a variety of media.

As one embodiment, the vibration may be performed by ultrasonic waves of 20 to 100 kHz.

That is, ultrasonic waves may impart external shock to particles due to intrinsic high frequency and electrolyte solutions shake at the molecular level by the external shock, and thereby mobility of electrolyte solutions may be maximized, and, accordingly, interfacial contact properties (wetting properties) of an electrode may be improved.

In particular, step (b) may be performed by ultrasonic waves having a frequency of 25 to 85 kHz and an amplitude of 2 to 30 µm.

The frequency and the amplitude are optimal values to improve interfacial contact properties between an electrode assembly and an electrolyte solution by maximizing mobility of electrolyte solutions. Therefore, when frequency and amplitude are lower than the values described above, desired effects may not be obtained. On the other hand, when frequency and amplitude are higher than the values described above, efficiency of a manufacturing process is reduced.

The ultrasonic waves may be applied once and, to increase efficiency, may be periodically or aperiodically applied twice or more.

In the present invention, a chamber equipped with a vibrating probe may be used.

In one embodiment, the vibrating probe may be installed in a chamber in a state of directly contacting an electrolyte solution as a target.

In another embodiment, the vibrating probe may be installed in a chamber in a state of being spaced from an electrolyte solution as a target. In this regard, when the vibrating probe and the target are excessively spaced, it is difficult to transfer vibration to the target. Accordingly, when efficiency of a manufacturing process is considered, a spaced distance may be 1 to 10 cm, particularly 2 to 8 cm.

When the vibrating probe and the target are spaced from each other, a non-aqueous gel may be interposed between the vibrating probe and the target.

The gel may be any oil so long as the gel is non-aqueous. In particular, the gel may be silicone oil.

That is, in the chamber according to the present invention, the vibrating probe and the target locate at spaced areas and, to efficiently propagate vibration occurring from the vibrating probe, the non-aqueous gel may be applied to an environment between the vibrating probe and the target.

Viscosity of the electrolyte solution, to which vibration is applied with the vibrating probe, may be 0.1 to 5 cP, particularly, 1 to 4 cP. Excessively high electrolyte solution viscosity is not preferable since mobility of electrolyte materials by vibration application may not be maximized.

The present invention provides a secondary battery manufactured according to the manufacturing method.

For example, an impregnation amount of an electrolyte solution of an electrode assembly located in the secondary battery internal may be 120% to 140% of an impregnation amount of an electrode assembly located in a secondary battery to which vibration is not applied.

Such a secondary battery may be particularly a lithium secondary battery.

Hereinafter, constituents of such a lithium secondary battery will be described.

The lithium secondary battery includes a cathode fabricated by drying and pressing after coating a mixture of a cathode active material, a conductive material and a binder on a cathode collector, and an anode fabricated in the same manner. In this case, as desired, the mixture may further include a filler.

The cathode current collector is generally fabricated to a thickness of 3 to 500 µm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

As the cathode active material, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; $Fe_2(MoO_4)_3$; and $LiNi_xMn_{2-x}O_4$ where $0.01 \leq x \leq 0.6$ may be used.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The anode current collector is generally fabricated to a thickness of 3 to 500 µm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

Such a lithium secondary battery may be structured such that an electrode assembly having a separator interposed between a cathode and an anode is impregnated with a lithium salt-containing electrolyte solution.

The separator is disposed between the cathode and the anode and an insulating thin film having high ion permeability and mechanical strength is used as the separator. The separator typically has a pore diameter of 0.01 to 10 µm and a thickness of 5 to 300 µm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte solution includes an electrolyte solution and a lithium salt as described above, and the electrolyte solution may be a non-aqueous organic solvent, an organic solid electrolyte, an inorganic solid electrolyte, or the like. However, the present invention is not limited thereto.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte solution. In some cases, in order to impart incombustibility, the electrolyte solution may further include a halogen-containing solvent such as carbon tetrachloride and ethylene trifluoride. In addition, in order to improve high-temperature storage characteristics, the electrolyte solution may further include carbon dioxide gas, fluoro-ethylene carbonate (FEC), propene sultone (PRS), or the like.

In a preferred embodiment, a lithium salt-containing non-aqueous electrolyte solution may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

A battery pack including the lithium secondary battery may be used as a power source of vehicles that require high-temperature stability, long cycle characteristics, high rate characteristics, and the like.

Examples of the vehicles include electric vehicles (EVs), hybrid electric vehicles (HEVs), plug-in hybrid electric vehicles (PHEVs), and the like, but the present invention is not limited thereto.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph illustrating impregnation amounts according to time with respect to an area of an electrode assembly according to Experimental Example 1.

MODE FOR INVENTION

Now, the present invention will be described in more detail with reference to the following examples. These examples are provided only for illustration of the present invention and should not be construed as limiting the scope and spirit of the present invention.

Example 1

A porous separator was interposed between a cathode including a cathode active material and an anode including an anode active material to manufacture an electrode assembly. Subsequently, a non-aqueous lithium electrolyte solution including ethylene carbonate and ethylmethyl carbonate mixed in a volumetric ratio of 3:7, and 1 M LiPF$_6$ as a lithium salt was prepared.

After injecting an electrolyte solution into a chamber equipped with a vibrating probe and then impregnating by soaking the electrode assembly manufactured as described above in the electrolyte solution, a vibration of 30 kHz was applied thereto.

The electrode assembly manufactured according to the above methods and the electrolyte solution were moved into a battery case together and then sealed, resulting in completion of a secondary battery.

Comparative Example 1

A secondary battery was manufactured in the same manner as in Example 1, except that vibration was not applied to an electrolyte solution.

Experimental Example 1

In each of Example 1 and Comparative Example 1, the amount of an impregnated electrolyte solution according to time was measured after injecting an electrolyte solution. Results are illustrated in FIG. 1 below.

In accordance with FIG. 1 below, it can be confirmed that the secondary battery, in which vibration was added to an electrolyte solution, manufactured according to Example 1 exhibits improved electrolyte solution impregnation amount and impregnation rate when compared to the secondary battery, in which vibration was not applied to an electrolyte solution, manufactured according to Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a method of manufacturing a secondary battery according to the present invention includes moving an electrode assembly with an electrolyte solution into a battery case after injecting the electrolyte solution into a chamber equipped with a vibrating probe and then applying predetermined vibration to the electrolyte solution with the vibrating probe. Accordingly, electrolyte solution impregnation properties, ionic conductivity, electronic conductivity and the like are improved and, as such, electrochemical performance of a secondary battery manufactured according to the method may be improved.

The invention claimed is:

1. A method of manufacturing a secondary battery, built in a battery case, having an electrode assembly impregnated with an electrolyte solution, the method comprising:
    injecting an electrolyte solution as a target into a chamber equipped with a vibrating probe;
    impregnating by soaking an electrode assembly, which has a separator interposed between a cathode and an anode, in the injected electrolyte solution contained in the chamber;
    after injecting the electrolyte solution into the chamber and soaking the electrode assembly in the injected electrolyte solution contained in the chamber, applying vibration with the vibrating probe at a frequency of 20 to 100 kHz to the electrolyte solution already injected into the chamber; and
    moving the electrode assembly with the electrolyte solution into a battery case,
    whereby interfacial wetting of the electrode assembly and the electrolyte solution is improved.

2. The method according to claim 1, wherein, in the impregnating, the vibration has an amplitude of 2 to 30 μm.

3. The method according to claim 1, wherein the vibration is applied once, or periodically or aperiodically twice or more.

4. The method according to claim 1, wherein the vibrating probe is installed in the chamber in a state of directly contacting the target.

5. The method according to claim 1, wherein the vibrating probe is installed in the chamber in a state of being spaced from the target.

6. The method according to claim 5, wherein a distance between the vibrating probe and the target is 1 to 10 cm.

7. The method according to claim 5, wherein a non-aqueous gel is interposed between the vibrating probe and the target.

8. The method according to claim 7, wherein the non-aqueous gel is composed of silicone oil.

9. The method according to claim 1, wherein the electrolyte solution has a viscosity of 0.1 cP or more and 5 cP or less.

10. The method according to claim 1, wherein the electrolyte solution has a viscosity of 1 cP or more and 4 cP or less.

11. A secondary battery manufactured using the method according to claim 1.

12. The secondary battery according to claim 11, wherein an impregnation amount of an electrolyte solution of the electrode assembly located in the secondary battery is 120% to 140% of an impregnation amount of an electrode assembly to which vibration is not applied.

13. The secondary battery according to claim 11, wherein the secondary battery is a lithium secondary battery.

14. A method of manufacturing a secondary battery, built in a battery case, having an electrode assembly impregnated with an electrolyte solution, the method comprising:
    injecting an electrolyte solution as a target into a chamber equipped with a vibrating probe, wherein the vibrating probe is installed in the chamber in a state of directly contacting the injected electrolyte solution;
    impregnating by soaking an electrode assembly, which has a separator interposed between a cathode and an anode, in an electrolyte solution contained in the chamber;
    applying vibration at a frequency of 20 to 100 kHz to the electrolyte solution with the vibrating probe; and
    moving the electrode assembly with the electrolyte solution into a battery case,
    whereby interfacial wetting of the electrode assembly and the electrolyte solution is improved.

15. A method of manufacturing a secondary battery, built in a battery case, having an electrode assembly impregnated with an electrolyte solution, the method comprising:
    injecting an electrolyte solution as a target into a chamber equipped with a vibrating probe, wherein the vibrating probe is installed in the chamber in a state of being spaced from the injected electrolyte solution;

impregnating by soaking an electrode assembly, which has a separator interposed between a cathode and an anode, in an electrolyte solution contained in the chamber;

applying vibration at a frequency of 20 to 100 kHz to the electrolyte solution with the vibrating probe; and moving the electrode assembly with the electrolyte solution into a battery case, whereby interfacial wetting of the electrode assembly and the electrolyte solution is improved.

16. The method according to claim 15, wherein a distance between the vibrating probe and the target is 1 to 10 cm.

17. The method according to claim 15, wherein a non-aqueous gel is interposed between the vibrating probe and the target.

18. The method according to claim 17, wherein the non-aqueous gel is composed of silicone oil.

* * * * *